United States Patent [19]
Raith

[11] Patent Number: 5,237,612
[45] Date of Patent: Aug. 17, 1993

[54] CELLULAR VERIFICATION AND VALIDATION SYSTEM

[75] Inventor: Alex K. Raith, Durham, N.C.

[73] Assignee: Ericsson GE Mobile Communications Inc., Research Triangle Park, N.C.

[21] Appl. No.: 677,232

[22] Filed: Mar. 29, 1991

[51] Int. Cl.⁵ ............... H04L 9/32; H04M 11/00
[52] U.S. Cl. ................. 380/23; 380/21; 380/43; 380/49; 379/59; 455/33.1; 455/54.1; 455/54.2
[58] Field of Search .......... 380/21, 23, 43, 44, 380/49; 455/54, 33, 33.1-33.4, 54.1-54.2; 379/59, 60

[56] References Cited

U.S. PATENT DOCUMENTS

| | | | |
|---|---|---|---|
| 3,934,078 | 1/1976 | Gannett | 380/47 |
| 4,549,308 | 10/1985 | LoPinto | 380/21 |
| 4,555,805 | 11/1985 | Talbot | 380/33 |
| 4,649,543 | 3/1987 | Levine | 371/41 |
| 4,731,840 | 3/1988 | Mniszewski et al. | 380/21 |
| 4,754,481 | 6/1988 | Feggeler | 380/41 |
| 4,803,726 | 2/1989 | Levine et al. | 380/48 |
| 4,827,507 | 5/1989 | Marry et al. | 380/38 |
| 4,860,353 | 8/1989 | Brown | 380/44 |
| 4,876,740 | 10/1989 | Levine et al. | 455/33 |
| 4,896,370 | 1/1990 | Kasparian et al. | 455/77 |
| 4,914,696 | 4/1990 | Dudczak et al. | 380/21 |
| 4,924,480 | 5/1990 | Gay et al. | 375/8 |
| 4,926,665 | 5/1990 | Stapley et al. | 70/277 |
| 5,091,942 | 2/1992 | Dent | 380/44 X |

*Primary Examiner*—Bernarr E. Gregory
*Attorney, Agent, or Firm*—Johnson & Gibbs

[57] ABSTRACT

A system for the validation and verification of base stations and mobile stations within a cellular radio communications network. The system includes a fixed key and a changeable key which are applied as inputs to an authentication algorithm. The algorithm generates key-dependent responses, at least one of which is independent of the changeable key. The responses generated by a particular mobile station are compared to the responses generated by the network and the presence of fraudulent users may be detected.

70 Claims, 4 Drawing Sheets

CELLULAR VERIFICATION AND VALIDATION SYSTEM

CROSS REFERENCE TO RELATED APPLICATION

This application contains subject matter related to copending U.S. patent application Ser. No. 07/704,133, entitled "Rolling Key Resynchronization in Cellular Verification and Validation System, file May 22, 1991, and to co-pending U.S. patent application Ser. No. 07/556,890, entitled "Authentication System For Digital cellular communications", filed on Jul. 23, 1990, now U.S. Pat. No. 509,942. The latter application incorporates by reference co-pending U.S. patent application Ser. No. 07/556,358, entitled "Encryption System For Digital Cellular Communications", now abandoned; co-pending U.S. patent application Ser. No. 07/556,102, entitled "Continuous. Cipher Synchronization for Cellular Communication System38 , now U.S. Pat. No. 5,060,266; and co-pending U.S. patent application Ser. No. 07/556,103, entitled "Resynchronization of Encryption Systems Upon Handoff", now U.S. Pat. No. 5,081,629; each of which were filed on Jul. 20, 1990. All of the foregoing applications, including the subject matter contained therein, are incorporated herein by reference.

BACKGROUND OF THE INVENTION

1. Field of the Invention

The present invention relates to wireless communications systems, and more particularly, to a method and apparatus for the validation and verification of base stations and mobile stations within a cellular radio communications system.

2. History of the Prior Art

Wireless Communications Systems

Information or data signals are carried by or transmitted through two basic categories of physical channels or media: bounded and unbounded. In a bounded medium, e.g., wire pairs, coaxial cables, waveguides, optical fibers, etc., the signals are generally confined to and, except for small leakage amounts, do not depart from, the medium The most common type of bounded medium consists of twisted wire pairs which are grouped together in cables. In an unbounded medium, e.g., air atmosphere, ocean water, etc., electromagnetic signals or radio waves radiate freely in and spread throughout the medium. The present invention, as described hereinafter, is more particularly concerned with wireless or cordless radio communications in unbounded media.

Various radio frequency schemes have been devised to facilitate the transmission of data carrying messages in unbounded media. Several communications standards for radio transmission have also been adopted or endorsed by international bodies. Examples of such standards include the Digital European Cordless Telecommunications (DECT), CT2 and CT3 standards. While the teachings of the present invention have broad applicability to radio communications systems in general, the primary focus of the discussion herein shall be cellular radio systems which are but one example of wireless communications. It will be appreciated, however, that the present invention is not limited to cellular radio systems and may be implemented in non-cellular radio systems as well.

Cellular Radio Systems

Cellular radio communication is, perhaps, the fastest growing field in the world-wide telecommunications industry. Although cellular radio communication systems comprise only a small fraction of the telecommunications systems presently in operation, it is widely believed that this fraction will steadily increase and will represent a major portion of the entire telecommunications market in the not too distant future. This belief is grounded in the inherent limitations of conventional telephone communications networks which rely primarily on wire technology to connect subscribers within the network. A standard household or office telephone, for example, is connected to a wall outlet, or phone jack, by a telephone cord of a certain maximum length. Similarly, wires connect the telephone outlet with a local switching office of the telephone company. A telephone user's movement is thus restricted not only by the length of the telephone cord, but also by the availability of an operative telephone outlet, i.e., an outlet which has been connected with the local switching office. Indeed, the genesis of cellular radio systems can be attributed, in large part, to the desire to overcome these restrictions and to afford the telephone user the freedom to move about or to travel away from his home or office without sacrificing his ability to communicate effectively with others.

In a typical cellular radio system, a metropolitan area is divided into several cells, each of which is served by a base station having a cell controller, a low-powered transmitter and an associated receiver. The user, or the user's vehicle, carries a relatively small, wireless device which communicates with the base station and connects the user to a mobile switching center or exchange. The exchange facilitates communications between the user, other mobile stations in the system and landline parties in the public switched telephone network ("PSTN"). The interconnection of mobile telephone users ("mobile subscribers") with the PSTN requires that each mobile subscriber in the system be made available to anyone who has a telephone, whether fixed or mobile. Hence, the problem of locating a mobile subscriber moving from one area to another (a "roaming subscriber" or "roamer") within a wide geographic area has become of primary importance. A known solution to this problem is based on the concept of mobile registration.

Mobile registration is the process by which a mobile telephone unit becomes listed as being present in the service area of one of the mobile exchanges in a mobile telephone service network. As each mobile telephone unit enters a new area within the network, it transmits a unique identity signal which is detected by the mobile exchange associated with that area. This exchange records an indication of the presence of the mobile subscriber in its memory and then informs all the other exchanges of the presence of the mobile subscriber within its coverage area at that particular moment. When the mobile subscriber crosses over into another area, the exchange associated with that area, upon receiving an identity signal from the telephone unit, will record an indication of the mobile subscriber's presence there and then transmit the identity signal to all of the other exchanges together with its own identity signal, for the purpose of updating the mobile subscriber's position.

In other known solutions, a mobile subscriber's identity and position messages are sent by each exchange, whose respective areas are crossed by such mobile subscriber, to a specific center. Any exchange in the mobile network which contacts this center may receive all the information necessary for locating and making a connection to the mobile subscriber. This solution eliminates the need to advise one or more of the other mobile exchanges each time a mobile subscriber enters a new area without making or receiving a call there and thereby reduces the amount of mobile subscriber location data that must be processed by each of the mobile exchanges within the network.

In some systems, the aforementioned center may be a common national center such as that used in the mobile telephone location system disclosed in U.S. Pat. No. 4,700,374 issued to Bini. In other systems, the center may be the exchange to which a mobile subscriber is assigned (the "home exchange"). In such other systems, the mobile subscriber may preregister in an area other than the normal service and billing area (the "home area") for service to be provided in the other area (the "visited area") by the exchange associated with the visited area (the "visited exchange"). When a roaming subscriber arrives in the visited area, the mobile subscriber is qualified to make telephone calls from there and calls which are received in the mobile subscriber's home area are forwarded to the visited area for transmission to the mobile subscriber.

Qualification of a mobile subscriber in a visited area may be automatically performed when the roaming subscriber appears in the visited area and the mobile station is switched on, e.g., when the user, initiates a first telephone cell. The roaming mobile station automatically transmits its identification number to the visited exchange and requests roamer service. If the roaming subscriber is a visitor from a cooperating exchange, the visited exchange provides service to the roaming subscriber by allocating a temporary roamer number to it. The visited exchange also notifies the roaming subscriber's home exchange of the roaming subscriber's location in the coverage area of the visited exchange. The roaming subscriber's identification number is then entered into a list of roamers in the home exchange so that incoming calls to the roaming subscriber are forwarded to the visited exchange where the roaming subscriber is then located.

Cellular Privacy

One significant disadvantage of existing cellular radio communication systems is the ease with which analog radio transmissions may be intercepted. In particular, some or all of the communications between the mobile station and the base station may be monitored, without authorization, simply by tuning an appropriate electronic receiver to the frequency or frequencies of the communications. Hence, anyone with access to such a receiver and an interest in eavesdropping can violate the privacy of the communications virtually at will and with total impunity. While there have been efforts to make electronic eavesdropping illegal, the clandestine nature of such activities generally means that most, if not all, instances of eavesdropping will go undetected and, therefore, unpunished and undeterred. The possibility that a competitor or a foe may decide to "tune in" to one's seemingly private telephone conversations has heretofore hindered the proliferation of cellular radio communication systems and, left unchecked, will continue to threaten the viability of such systems for businesses and government applications.

It has recently become clear that the cellular radio telecommunications systems of the future will be implemented using digital rather than analog technology. The switch to digital is dictated, primarily, by considerations relating to system speed and capacity. A single analog, or voice, radio frequency (RF) channel can accommodate three (3) to six (6) digital, or data, RF channels. Thus, by digitizing speech prior to transmission over the voice channel, the channel capacity and, consequently the overall system capacity, may be increased dramatically without increasing the bandwidth of the voice channel. As a corollary, the system is able to handle a substantially greater number of mobile stations at a significantly lower cost.

Although the switch from analog to digital cellular radio systems ameliorates somewhat the likelihood of breeches in the security of communications between a base station and a mobile station, the risk of electronic eavesdropping is far from eliminated. A digital receiver may be constructed which is capable of decoding the digital signals and generating the original speech. The hardware may be more complicated and the undertaking more expensive than in the case of analog transmission, but the possibility persists that highly personal or sensitive conversations in a digital cellular radio system may be monitored by a third party and potentially used to the detriment of the system users. Moreover, the very possibility of third parties eavesdropping on a telephone conversation eliminates cellular telecommunications as a medium for certain government communications. Certain business users may be equally sensitive to even the possibility of a security breech. Thus, to render cellular systems as viable alternatives to the conventional wireline networks, security of communications must be available on at least some circuits.

Various solutions have been proposed to alleviate the security concerns engendered by radio transmission of confidential data. A known solution, implemented by some existing communication systems, uses cryptoalgorithms to encrypt (scramble) digital data into an unintelligible form prior to transmission. A general discussion of cryptographic systems may be found in the article entitled "Cloak and Data" by Rick Grehan in BYTE Magazine, dated June 1990 at pages 311-324. In most systems currently available, speech is digitized and processed through an encryption device to produce a communications signal that appears to be random or pseudorandom in nature until it is decrypted at an authorized receiver. The particular algorithm used by the encryption device may be a proprietary algorithm or an algorithm found in the public domain. Further background for such techniques may be found in the article entitled "The Mathematics of Public-Key Cryptography" by Martin E. Hellman in *Scientific American,* dated August 1979 at 146-167.

One technique for the encryption of data relies on "time-of-day" or "frame number" driven keystream generators to produce keystreams of psuedo-random bits which are combined with the data to be encrypted. Such keystream generators may be synchronized to a time of day counter, i.e. hour, minute and second, or to a simple number counter and the encryption and decryption devices may be synchronized by transmitting the current count of the transmitter counter to the receiver in the event one falls out of synchronization with another.

To increase the security of communications in systems utilizing time-of-day or frame number driven keystream generators, the value of each bit in the pseudo-random keystream is preferably made a function of the values of all the key bits in an encryption key. In this manner, a person desiring to descramble the encrypted signal must "crack" or "break" all of the bits of the encryption key which may be in the order of fifty (50) to one hundred (100) bits or more. A keystream of this type is generally produced by mathematically expanding the encryption key word in accordance with a selected algorithm which incorporates the count of the time-of-day counter. However, if every bit of the encryption key is to influence every bit in the keystream and if the keystream is to be added to the data stream bits on a one-to-one basis, the required number of key word expansion computations per second is enormous and can readily exceed the real time computation capability of the system. The co-pending application Ser. No. 07/556,358, entitled "Encryption System for Digital Cellular Communications", referred to above, achieves such expansion of the keystream with conventional microprocessors and at conventional microprocessor speeds.

The use of an encryption key to generate a pseudo-random keystream which is a complex function of all the key bits is a very useful tool for securing digital communications. Other tools may include arrangements for ensuring that the secret key assigned to each mobile station (the permanent key) is never directly used outside of the home network, i.e., the normal service and billing area of the mobile station. Instead, the permanent key is used to generate other bits (the security key) which are used for enciphering a particular call and which may be transmitted from the home network to a visited network, i.e., an area other than the normal billing area into which the mobile station has roamed. Such arrangements reduce the risk of unauthorized disclosure of the secret key to a third party which may use the secret key to defeat the encryption process.

Cellular Fraud

Another significant disadvantage of existing cellular radio communication systems has been the widespread fraudulent use of mobile identification numbers ("MINs") to steal cellular service. The past, present and future state of cellular fraud and the resultant revenue and service losses are discussed in the article entitled "Cellular Fraud" by Henry M. Kowalczyk in *Cellular Business*, dated March 1991, at 32-35. As stated therein, the earliest form of cellular fraud was roamer fraud in which the MIN of a paying (valid) mobile subscriber was used by a nonsubscriber to qualify for service with a serving switch and to place fraudulent calls from the area served by the switch. Such fraudulent use was often not detected unless and until the billing information was received and questioned by the paying subscriber.

In response to this early and comparatively simple form of roamer fraud, a variety of verification and validation systems were developed and installed. While these systems were somewhat successful in reducing roamer fraud levels to a more acceptable level, they did not eliminate it. Furthermore, recent advances in technology have produced a new and more sophisticated form of fraud known as "ESN tumbling" which takes advantage of certain post-first-call limitations of these systems by changing the electronic serial number ("ESN") of a caller rather than the caller's MIN after placing one or more successful roamer calls with the first ESN. Efforts to combat ESN tumbling through post-first-call validation have, in turn, led to a new fraud technology in which both the MIN and the ESN are tumbled.

Although short-term, piecemeal solutions to the problem of cellular fraud have been developed and implemented, including defaulting all roamers to 0+ dialing and even cancellation of roamer service in some oases, they have not kept pace with the increasing complexity of fraud systems New and elusive fraud types, such as cloning, whereby a fraudulent user adopts the directory telephone number of a valid subscriber, require long-term solutions which will prevent existing fraud methods and outpace emerging fraud technologies. One such long-term solution is based on the authentication of mobile stations at registration, call initiation or call reception, or during call conversation.

Authentication may be simply viewed as the process of confirming the identity of a mobile station in the network. Both authentication and encryption require communication between the visited network and the home network, where the mobile station has a permanent registration, in order to obtain mobile-specific information such as the security key used for encryption which is preferably calculated in the home network. The co-pending U.S. patent application Ser. No. 07/556,890, entitled "Authentication System For Digital Cellular Communications", referred to above, discloses an authentication system in which the functions of authentication and encryption can be linked so that a single inter-network transaction establishes both functions. As described in detail therein, the foregoing authentication system achieves such integration by generating, in the same transaction, not only a key-dependent response (RESP) to a random challenge (RAND), but also a security key (S key) which may be used to encipher user traffic.

As mentioned earlier, a serious problem in existing cellular systems is the fraudulent use of cellular service by invalid or "false" mobile stations. Heretofore, for example, it has been possible to copy the entire memory contents of a mobile station and to manufacture clones which may demand and receive service from the network. One proposed solution is to provide each authorized mobile station with a specific authentication module, or smart card, which has read-only or read-and-write only access for the permanent key. This solution, however, renders the mobile station more complex and more expensive. The authentication system described in the co-pending U.S. patent application Ser. No. 07/556,890, entitled "Authentication System For Digital Cellular Communications", includes a "rolling key" (B-key) which affects response (RESP) and provides a more cost effective safeguard against the threat of false mobile station. In addition, to meet the threat of a "false base station" in the network, the foregoing authentication system includes a bilateral authentication procedure which may be used when the rolling key is updated. This two-way authentication procedure enhances security and permits bilateral authentication to be performed, for example, on the dedicated traffic channels of the system at any time during a call. Each authentication step may be generally performed at the option of the network operator, but is preferably performed at least once after the active presence of a mobile station is first detected within a network so as to generate an S-key for the first call where encryption is enabled.

The rolling key or B-key used to counteract false mobile stations in the network may occasionally fall out of synchronization. If the response (RESP) depends on the B-key, and the network and a valid mobile station are using different B-keys, the RESP generated by the mobile station and transmitted to the network will not match the RESP internally generated by the network. The valid mobile station will then appear to the network as a fraudulent mobile station. The present invention allows the network to distinguish between a valid mobile station using an unsynchronized B-key and a fraudulent mobile station. In addition, the present invention also allows the network to distinguish between the classical non-clone, e.g., ESN tumbling, fraudulent users and the more advanced clone fraudulent users.

SUMMARY OF THE INVENTION

In one aspect, the system of the present invention includes a procedure and hardware for providing adaptable authentication of a mobile station within a radio network.

In another aspect, the present invention includes a method for the verification and validation of a mobile station in a radio network in accordance with an authentication algorithm executed in each of the mobile station and the network. A random challenge signal is transmitted from the network to the mobile station. A set of inputs including the random challenge signal transmitted from the network to the mobile station, a fixed key value and a changeable key value are applied to the authentication algorithm. A set of outputs including a first response signal, which is dependent on the fixed key value and independent of the changeable key value, and a second response signal, which is dependent on the changeable key value, are generated from the authentication algorithm. The first and second response signals are transmitted to the network and compared with the first and second response signals generated in the network.

In still another aspect, the system of the present invention includes the generation of parameters for use in enhancing the security of communications in a communications network wherein a mobile station is assigned a unique multi-digit permanent key, wherein a changable multi-digit rolling key is employed for increased security, and wherein both the permanent key and the rolling key are stored in the mobile station and in the network. A plurality of multi-digit input signals received at a location include a signal representative of an authentication inquiry from the network along with the multi-digit permanent key of a particular mobile station and the multi-digit rolling key associated with the particular mobile station at that particular time. At least some of the digits of the input signals are arranged in a first grouping and a first output value is calculated in accordance with a first algorithm from the first grouping of input signals and the permanent key digits. Sequentially arranged blocks of at least some of the digits comprising the first output value are assigned to selected parameters for use within the system including a first authentication response to be used by the mobile station to reply to the authentication inquiry by the network. At least some of the digits of the input signals are arranged in a second grouping and a second output value is calculated in accordance with a second algorithm from the second grouping of input signals and the permanent and rolling key digits. Sequentially arranged blocks of at least some of the digits comprising the second output value are assigned to selected parameters for use within the system including a second authentication response to be used by the mobile station to reply to the authentication inquiry by the network. The first and second authentication responses may be combined into a single authentication response signal.

BRIEF DESCRIPTION OF THE DRAWINGS

The present invention will be better understood and its numerous objects and advantages will become apparent to those skilled in the art by reference to the following drawings in which.

DETAILED DESCRIPTION OF THE PREFERRED EMBODIMENT

Digital Cellular System

Figure 1:
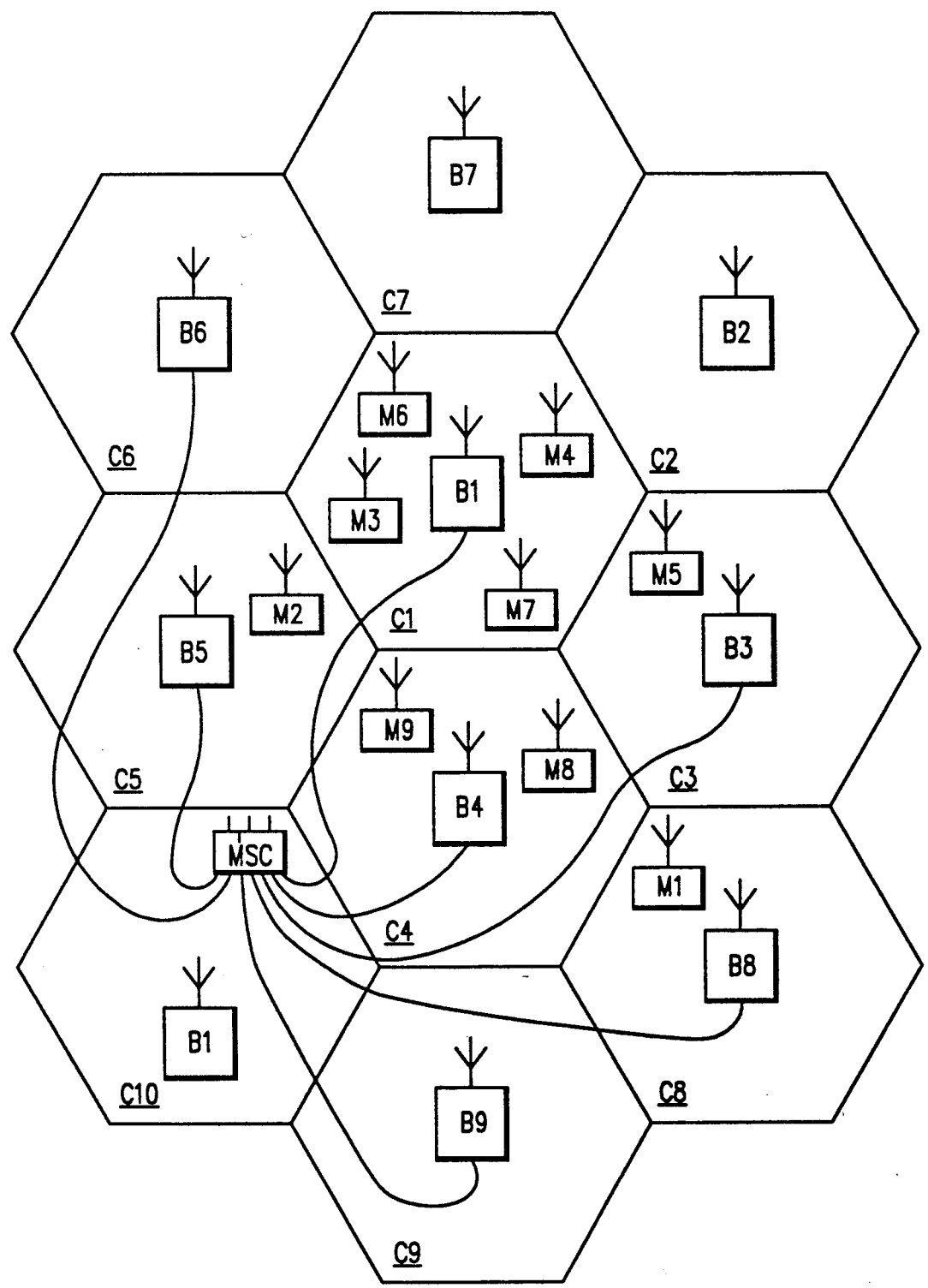
FIG. 1 is a pictorial representation of a cellular radio communications system including a mobile switching center, a plurality of base stations and a plurality of mobile stations.

Referring first to FIG 1, there is illustrated therein a conventional cellular radio communications system of a type to which the present invention generally pertains. In FIG 1, an arbitrary geographic area may be seen divided into a plurality of contiguous radio coverage areas, or cells, C1–C10. While the system of FIG. 1 is shown to include only 10 cells, it should be clearly understood that, in practice, the number of cells may be much larger.

Associated with and located within each of the cells C1–C10 is a base station designated as a corresponding one of a plurality of base stations B1–B10. Each of the base stations B1–B10 includes a transmitter, a receiver and controller as is well known in the art In FIG. 1, the base stations B1–B10 are located at the center of the cells C1–C10, respectively, and are equipped with omni-directional antennas. However, in other configurations of the cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system.

With continuing reference to FIG 1, a plurality of mobile stations M1–M10 may be found within the cells C1–C10. Again, only ten mobile stations are shown in FIG. 1 but it should be understood that the actual number of mobile stations may be much larger in practice and will invariably exceed the number of base stations. Moreover, while none of the mobile stations M1-M10 may be found in some of the cells C1-C10, the presence or absence of the mobile stations M1-M10 in any particular one of the cells C1-C10 should be understood to depend, in practice, on the individual desires of each of the mobile stations M1-M10 who may roam from one location in a cell to another or from one cell to an adjacent or neighboring cell.

Each of the mobile stations M1-M10 is capable of initiating or receiving a telephone call through one or more of the base stations B1-B10 and a mobile switching center MSC. The mobile switching center MSC is connected by communications links, e.g. cables, to each of the illustrative base stations B1-B10 and to the fixed public switching telephone network (PSTN), not shown, or a similar fixed network which may include an integrated system digital network (ISDN) facility. The relevant connections between the mobile switching center MSC and the base stations B1-B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1-C10 is allocated a plurality of voice or speech channels and at least one access or control channel. The control channel is used to control or supervise the operation of mobile stations by means of information transmitted to and received from those units. Such information may include incoming call signals, outgoing call signals, page signals, page response signals, location registration signals, voice channel assignments, maintenance instructions and "handoff" instructions as a mobile station travels out of the radio coverage of one cell and into the radio coverage of another cell. The control or voice channels may operate either in an analog or a digital mode or a combination thereof. In the digital mode, analog signals, such as voice or DTMF tone signals, are converted to digital signal representations prior to transmission over the RF channel. Purely data messages, such as those generated by computers or by digitized voice devices, may be formatted and transmitted directly over a digital channel.

Signals from more than one source must normally be sent over a single RF channel in a cellular radio system. The bandwidth of a channel available to carry signals may be allocated by frequency, time intervals or codes. In frequency division multiplexing (FDM), the frequency spectrum represented by the available bandwidth of a channel is divided into smaller bandwidth portions and one of several signal sources is assigned to each portion. Another method for dividing the capacity of a channel among several separate signal sources is time division multiplexing (TDM). In a cellular radio system using TDM, a plurality of digital channels may share a common RF channel. The RF channel is divided into a series of "time slots", each containing a burst of information from a different data source and separated by guard time from one another, and the time slots are grouped into "frames" as is well known in the art. The number of time slots per frame varies depending on the bandwidth of the digital channels sought to be accommodated by the RF channel. The frame may, for example, consist of three (3) time slots, each of which is allocated to a digital channel. Thus, the RF channel will accommodate three digital channels. In one embodiment of the present invention discussed herein, a frame is designated to comprise three time slots. However, the teachings of the present invention should be clearly understood to be equally applicable to a cellular radio system utilizing any number of time slots per frame. Further, the teachings of the present invention are equally applicable to a cellular radio system utilizing frequency division multiplexing (FDM) or code division multiplexing (CDM).

Mobile Station

Figure 2:
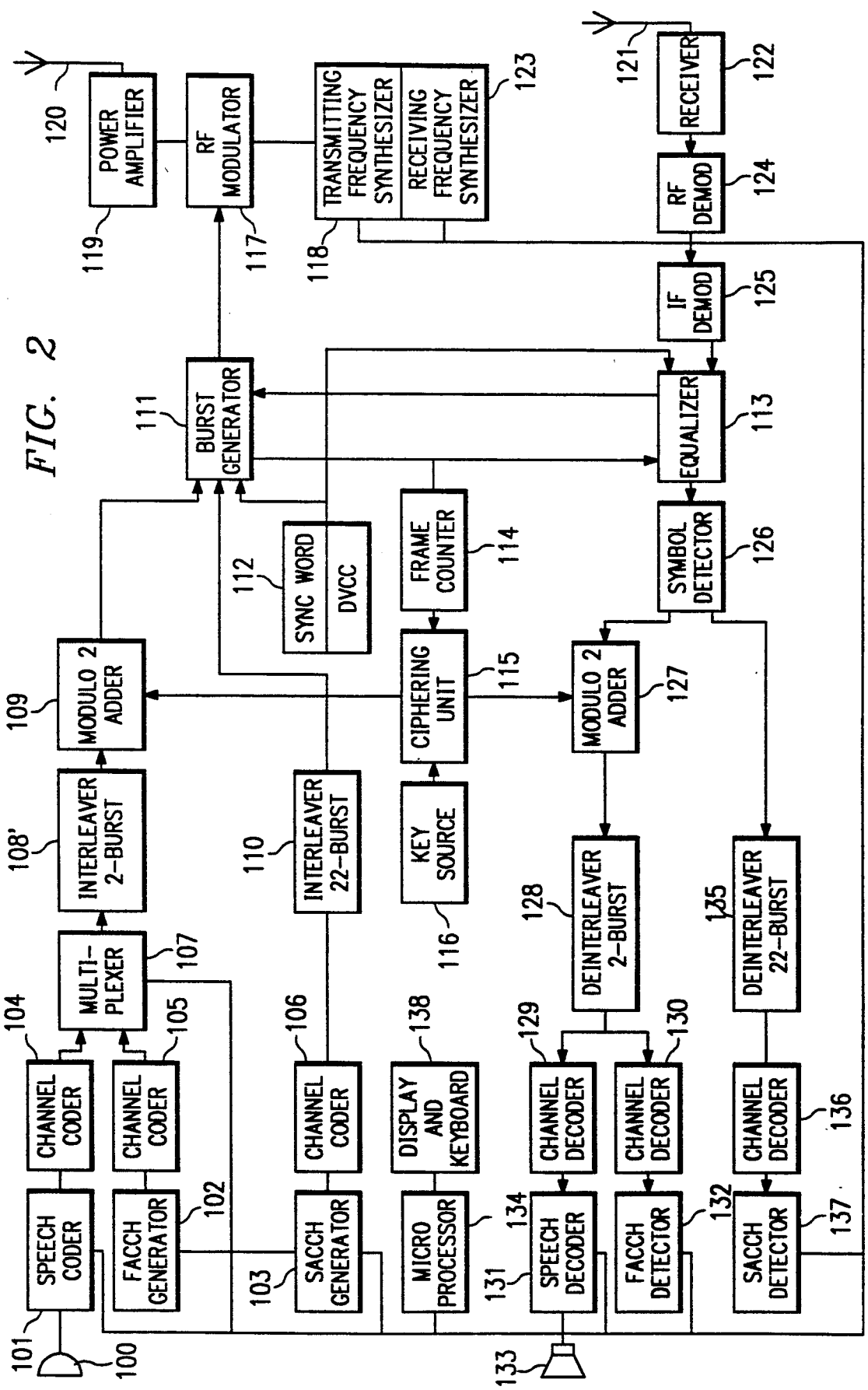
FIG. 2 is a schematic block diagram of mobile station equipment used in accordance with one embodiment of the system of the present invention.

Referring next to FIG. 2, there is shown therein a schematic block diagram of the mobile station equipment which are used in accordance with one embodiment of the present invention. The equipment illustrated in FIG. 2 may be used for communication over digital channels. A voice signal detected by a microphone 100 and destined for transmission by the mobile station is provided as input to a speech coder 101 which converts the analog voice signal into a digital data bit stream. The data bit stream is then divided into data packets or messages in accordance with the time division multiple access (TDMA) technique of digital communications. A fast associated control channel (FACCH) generator 102 exchanges control or supervisory messages with a base station in the cellular radio system. The conventional FACCH generator operates in a "blank and burst" fashion whereby a user frame of data is muted and the control message generated by the FACCH generator 102 is transmitted instead at a fast rate.

In contrast to the blank and burst operation of the FACCH generator 102, a slow associated control channel (SACCH) generator 103 continuously exchanges control messages with the base station. The output of the SACCH generator is assigned a fixed length byte, e g 12 bits, and included as a part of each time slot in the message train (frames). Channel coders 104, 105, 106 are connected to the speech coder 101, FACCH generator 102 and SACCH generator 103, respectively. Each of the channel coders 104, 105, 106 performs error detection and recovery by manipulating incoming data using the techniques of convolutional encoding, which protects important data bits in the speech code, and cyclic redundancy check (CRC), wherein the most significant bits in the speech coder frame, e.g., 12 bits, are used for computing a 7 bit error check.

Referring again to FIG. 2, the channel coders 104, 105 are connected to a multiplexer 107 which is used for time division multiplexing of the digitized voice messages with the FACCH supervisory messages. The output of the multiplexer 107 is coupled to a 2-burst interleaver 108 which divides each data message to be transmitted by the mobile station (for example, a message containing 260 bits) into two equal but separate parts (each part containing 130 bits) arranged in two consecutive time slots. In this manner, the deteriorative effects of Rayleigh fading may be significantly reduced. The output of the 2-burst interleaver 108 is provided as input to a modulo-2 adder 109 where the data to be transmitted is ciphered on a bit-by-bit basis by logical modulo-2 addition with a pseudo-random keystream which may be generated in accordance with the system described in the co-pending U.S. patent application Ser. No. 07/556,358, entitled "Encryption System for Digital Cellular Communications", referred to above The output of the channel coder 106 is provided as input to a 22-burst interleaver 110. The 22-burst interleaver 110 divides the SACCH data into 22 consecutive time slots, each occupied by a byte consisting of 12 bits of control information. The interleaved SACCH data forms one of the inputs to a burst generator 111. Another input to the burst generator 111 is provided by the output of the modulo-2 adder 109. The burst generator 111 produces "message bursts" of data, each consisting of a time slot identifier (TI), a digital verification color code (DvCC), control or supervisory information and the data to be transmitted, as further explained below.

Transmitted in each of the time slots in a frame is a time slot identifier (TI), which is used for time slot identification and receiver synchronization, and a digital verification color code (DVCC), which ensures that the proper RF channel is being decoded. In the exemplary frame of the present invention, a set of three different 28-bit TIs is defined, one for each time slot while an identical 8-bit DVCC is transmitted in each of the three time slots. The TI and DVCC are provided in the mobile station by a sync word/DvCC generator 112 connected to the burst generator 111 as shown in FIG. 2. The burst generator 111 combines the outputs of the modulo-2 adder 109, the 22-burst interleaver 110 and the sync word/DVCC generator 112 to produce a series of message bursts, each comprised of data (260 bits), SACCH information (12 bits), TI (28 bits), coded DVCC (12 bits) and 12 delimiter bits for a total of 324 bits which may be integrated according to the time slot format specified by the EIA/TIA IS-54 standard.

Each of the message bursts is transmitted in one of the three time slots included in a frame as discussed hereinabove. The burst generator 111 is connected to an equalizer 113 which provides the timing needed to synchronize the transmission of one time slot with the transmission of the other two time slots. The equalizer 113 detects timing signals sent from the base station (master) to the mobile station (slave) and synchronizes the burst generator 111 accordingly. The equalizer 113 may also be counter 114 which is used to update a ciphering code that is applied by the mobile station every 20 ms, i.e., once for every transmitted frame. The ciphering code is generated by a ciphering unit 115 with the use of a mathematical algorithm and under the control of a key 116 which is unique to each mobile station. The algorithm may be used to generate a pseudo-random keystream in accordance with the system described in the co-pending U.S. patent application Ser. No. 07/556,358, entitled "Encryption System for Digital Cellular Communications".

The message bursts produced by the burst generator 110 are provided as input to an RF modulator 117. The RF modulator 117 is used for modulating a carrier frequency according to the π/4-DQPSK technique (π/4 shifted, differentially encoded quadrature phase shift key). The use of this technique implies that the information to be transmitted by the mobile station is differentially encoded, i.e., two bit symbols are transmitted as 4 possible changes in phase: +or π/4 and + or −3 π/4. The carrier frequency for the selected transmitting channel is supplied to the RF modulator 117 by a transmitting frequency synthesizer 118. The burst modulated carrier signal output of the RF modulator 117 is amplified by a power amplifier 119 and then transmitted to the base station through an antenna 120.

The mobile station receives burst modulated signals from the base station through an antenna 121 connected to a receiver 122. A receiver carrier frequency for the selected receiving channel is generated by a receiving frequency synthesizer 123 and supplied to a an RF demodulator 124. The RF demodulator 124 is used to demodulate the received carrier signal into an intermediate frequency signal. The intermediate frequency signal is then demodulated further by an IF demodulator 125 which recovers the original digital information as it existed prior to π/4-DQPSK modulation. The digital information is then passed through the equalizer 113 to a symbol detector 126 which converts the two-bit symbol format of the digital data provided by the equalizer 113 to a symbol detector 126 which converts the two-bit symbol format of the digital data provided by the equalizer 114 to a single bit data stream.

The symbol detector 126 produces two distinct outputs: a first output, comprised of digitized speech data and FACCH data, and a second output, comprised of SACCH data. The first output is supplied to a modulo-2 adder 127 which is connected to a 2-burst deinterleaver 128. The modulo-2 adder 127 is connected to the ciphering unit 115 and is used to decipher the encrypted transmitted data by subtracting a bit-by-bit basis the same pseudo-random keystream used by the transmitter in the base station to encrypt the data The modulo-2 adder 127 and the 2-burst deinterleaver 128 reconstruct the speech/FACCH data by assembling and rearranging information derived from two consecutive frames of the digital data. The 2-burst deinterleaver 128 is coupled to two channel decoders 129, 130 which decode the convolutionally encoded speech/FACCH data using the reverse process of coding and check the cyclic redundancy check (CRC) bits to determine if any error has occurred. The channel decoders 129, 130 detect distinctions between the speech data on the one hand, and any FACCH data on the other, and route the speech data and the FACCH data to a speech decoder 131 and an FACCH detector 132, respectively. The speech decoder 13 processes the speech data supplied by the channel decoder 129 in accordance with a speech coder algorithm, e.g. VSELP, and generates an analog signal representative of the speech signal transmitted by the base station and received by the mobile station. A filtering technique may then be used to enhance the quality of the analog signal prior to broadcast by a speaker 133. Any FACCH messages detected by the FACCH The second output of the symbol detector 126 (SACCH data) is supplied to a 22-burst deinterleaver 135. The 22 burst interleaver 135 reassembles and rearranges the SACCH data which is spread over 22 consecutive frames. The output of the 22-burst deinterleaver 135 is provided as input to a channel decoder 136. SACCH messages are detected by an SACCH detector 137 and the control information is transferred to the microprocessor 134.

The microprocessor 134 controls the activities of the mobile station and communications between the mobile station and the base station. Decisions are made by the microprocessor 134 in accordance with messages received from the base station and measurements performed by the mobile station. The microprocessor 134 is also provided with a terminal keyboard input and display output unit 138. The keyboard and display unit 138 allows the mobile station user to exchange information with the base station.

Base Station

Figure 3:
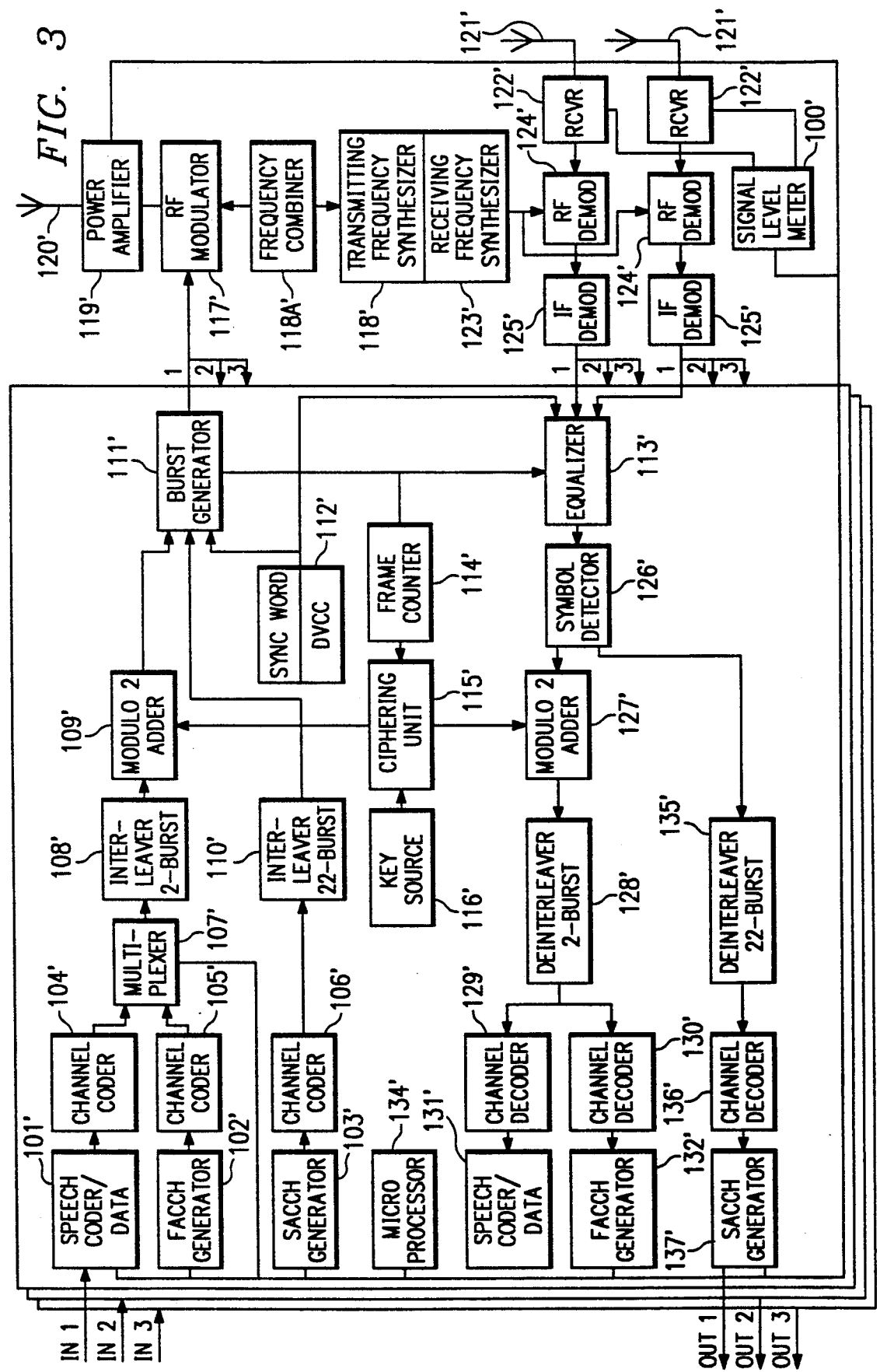
FIG. 3 is a schematic block diagram of base station equipment used in accordance with one embodiment of the system of the present invention.

Referring next to FIG. 3, there is shown a schematic block diagram of the base station equipment which are used in accordance with one embodiment of the present invention. A comparison of the mobile station equipment shown in FIG. 2 with the base station equipment shown in FIG. 3 demonstrates that much of the equipment used by the mobile station and the base station are substantially identical in construction and function. Such identical equipment are, for the sake of convenience and consistency, designated with the same reference numerals in FIG. 3 as those used in connection with FIG. 2, but are differentiated by the addition of a prime (') in FIG. 3.

There are, however, some minor differences between the mobile station and the base station equipment. For instance, the base station has, not just one but, two receiving antennas 121'. Associated with each of the receiving antennas 121' are a receiver 122', an RF demodulator 124', and an IF demodulator 125, Furthermore, the base station includes a programmable frequency combiner 118A' which is connected to a transmitting frequency synthesizer 118'. The frequency combiner 118A' and the transmitting frequency synthesizer 118' carry out the selection of the RF channels to be used by the base station according to the applicable cellular frequency reuse plan. The base station, however, does not include a user keyboard and display unit similar to the user keyboard and display unit 138 present in the mobile station. It does however include a signal level meter 100' connected to measure the signal received from each of the two receivers 122' and to provide an output to the microprocessor 134'. Other differences in equipment between the mobile station the base station may exist which are well known in the art.

Having described an operating environment consisting of a cellular radio network including mobile stations and base stations, the verification and validation system of the present invention will be set forth below in detail. Unless the context otherwise requires, the term "network" as used hereinafter includes a single base station having a limited radio coverage area and associated with an exchange in a cellular radio communications system. Hence, the term "home network" as used hereinafter includes a base station associated with the home exchange while the term "visited network" as used hereinafter includes a base station associated with the visited exchange.

Authentication

Figure 4:
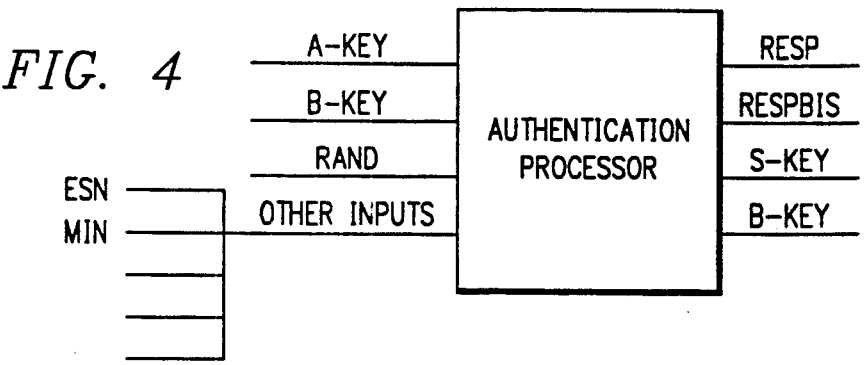
FIG. 4 is a pictorial representation of an authentication system which may be used for both unilateral and bilateral authentication.

Referring now to FIG. 4, a pictorial representation of an authentication system having a plurality of inputs applied to an algorithm and a plurality of outputs generated by the algorithm may now be seen. The depiction in FIG. 4 will form the basis for the ensuing discussion of both unilateral and bilateral authentication which, for convenience and simplicity, are assumed to be executed by the authentication system with the use of one authentication algorithm referred to hereinafter as AUTH. In other words, it is assumed for purposes of the following discussion that the same authentication algorithm (AUTH) is used in generating the outputs needed for unilateral and bilateral authentication. Conceivably, a different algorithm may be used for unilateral authentication than for bilateral authentication so long as the same unilateral and bilateral authentication algorithms are used by both the mobile station and the network. The particular choice and specific details of the authentication algorithm(s), however, are not critical aspects of the present invention and reference is hereby made to U.S. patent application Ser. No. 07/556,890, entitled "Authentication System For Digital Cellular Communications", which sets forth an exemplary authentication algorithm, as may be or useful for a more complete understanding of the present invention.

Unilateral Authentication

To perform the process of unilateral authentication, the network determines and broadcasts to the mobile station a random challenge number ("RAND") contained, for example, in a random challenge global action message periodically appended to the overhead message train. The mobile station stores the value of the RAND in memory and identifies itself to the network by sending a mobile identification number (MIN) derived, for example, from the mobile station's 10-digit directory telephone number (area code and telephone number), so that the network can retrieve information pertaining to that particular mobile station, e.g., security keys, from the location or database in which they are stored. The mobile station and the network each uses bits of the RAND, a permanent authentication key (A-key), which is a secret key known only to the mobile station and the network and preferably never transmitted over the air interface, and other inputs including, for example, the factory-set electronic serial number (ESN) which uniquely identifies the mobile station, and, possibly also, the MIN of the mobile station, to compute both a response (RESP) to the RAND and a short-term or temporary encryption key (S-key or call variable) in accordance with a preselected authentication algorithm (AUTH). The RESP generated at the mobile station is transmitted to the network where it is compared with the internally generated version and, if a match is found, the network may grant the mobile station access for registration or initiation or reception of a call. The S-key can be used to encipher subsequent calls placed to or from the mobile station.

RAND

The RAND used for unilateral authentication (discussed above) is a "global" RAND which is determined by, for example, the visited network and sent to all mobile stations in the coverage area of the visited network. By constrast, the RAND used for bilateral authentication (discussed below) is a "mobile-specific" RAND which is determined by, for example, the home network and sent to a particular mobile station in the coverage area of a visited network. The specific choices between global and mobile-specific, and between home network and visited network, RANDs made herein are for illustration purposes only and are not intended as a limitation on the present invention. Similarly, the particular type of communications channel, e.g., voice or control, used for transmitting the RAND to the mobile station is an implementation issue for network operators. It will be appreciated by those of ordinary skill in the art, however, that the common control channel is especially suited for global RAND transmission while the mobile-specific RAND may be advantageously transmitted over the voice or speech channel.

Secret Keys Management

Another implementation issue for network operators is secret keys management. Secret keys, such as the A-key (and the B-key discussed below), must be stored in a convenient location from which they can be readily accessed. The particular network location selected for storage of the secret keys has certain operational ramifications which are not of immediate significance to the present invention. It should be noted, however, that inter-network communications are simplified and security is enhanced if the secret keys, e.g., the A-key (and the B-key), are stored in the home network, or at least in a location under the control of the home network, so that only security variables, e.g., S-key, are transmitted between the home network and a visited network. In parts of the remaining discussion, it is assumed that the secret keys are stored in, or controlled by, the home network of the mobile station.

The issue of secret keys management arises in connection with the mobile station as well. The mobile station may, for example, store all the secret keys, e.g., A-key and B-key, in an internal memory device. Alternatively, each mobile subscriber may carry a subscriber identity module (SIM), e.g., smart card, which contains the secret keys and which may be connected to the mobile station memory. In some applications, the mobile station may store one of the secret keys in internal memory and the other key may be stored in the SIM. It should be clearly understood that the question of secret keys management, whether as to the network or the mobile station, is ancillary to the present invention as set forth herein.

Location of AUTH

Yet another implementation issue for network operators is the network location for execution of AUTH. If AUTH is executed in the home network, the visited network must transmit at least MIN and global RAND to the home network in order to receive the RESP and S-key. On the other hand, if AUTH is executed in the visited network, that network must transmit at least MIN to the home network and the home network must, in turn, transmit to the visited network the encryption key (if different from the A-key).

From a security standpoint, however, it is undesirable for the home network to release a subscriber's permanent security key merely on demand by a visited network. Such keys should constitute the subscriber's long-term security guarantee rather than a short-term call variable. It is, therefore, more desirable that the home network, upon receiving from the visited network the MIN of a visiting mobile station, the RAND broadcast by the visited network and the RESP received by the visited network from the mobile station, generate a short-term (temporary) ciphering key (S-key or call variable) and release the S-key to the visited network only if the RESP is deemed to be valid.

Call Variable or S-Key

Execution of the authentication algorithm in the home network allows the authentication algorithm (AUTH) to safely use the long-term (permanent) secret key, referred to herein as the A-key, which is unique to each mobile station. The A-key is preferably never released outside the home network and never used directly for enciphering but is, instead, used for generating a short-term encryption key, referred to herein as the S-key. The S-key is used only for a limited period of time to be determined by the cellular operator. If, for example, the visited network has already acquired an S-key for a previously registered visiting (roaming) mobile station, performance of authentication is optional and call set-up may proceed directly to the enciphered traffic channel. Hence, it is not necessary for inter-network exchanges to take place every time a visiting mobile station places a call. If, on the other hand, the visited network decides to request an authentication, the mobile station and the home network will use the current RAND of the visited network to generate a new S-key, other inputs to the AUTH algorithm being unchanged.

Rolling Key or B-key

A valid mobile station may be borrowed, stolen or legally acquired and its entire memory contents may be copied, including its ESN, secret keys, e.g., A-key, etc., and used to manufacture a number of clones which produce authentication responses which are identical to those of the valid mobile station. The cloning procedure may be quite sophisticated and may include software modifications which replace physically stored ESN information with electronically stored information so that a number of stored mobile station identities may by cyclically rotated (tumbled) within one false mobile station and used to imitate several genuine mobile stations. The authentication system of FIG. 4 provides an anti-cloning safeguard based on a dynamic, i.e., changeable, "rolling key" which is stored in each of the home network and the mobile station and which is used along with the permanent secret key (A-key) for calculating authentication responses, temporary encryption keys and new rolling keys.

The principle behind the rolling key concept is to require certain historical information in each of the network and the mobile station to match as a means of protection against clones and as an alternative to requiring complex and expensive physical protection of mobile station memories. Specifically, in order for a clone mobile station to gain access to the network, the clone would be required to intercept the entire history of authentication challenges subsequent to the time of copying the then current key state of a genuine mobile station. Because each authentication may change the value of the rolling key (B-key), the key-dependent responses generated by a valid and a clone mobile station, which have identical memory contents, e.g., A-key and B-key, at the time of copying but different authentication histories, e.g., B-keys, at some future point, will begin to diverge from each other and from the responses internally generated by the network thereby alerting the network to the existence of the clone. In the absence of a rolling key, a clone which has copied the A-key will always produce the same response as the valid mobile station and may thus escape detection.

Consistent with the present invention, authentication may be carried out in the home network using a combination of a rolling key, referred to herein as the B-key, which contains historical information, and the permanent mobile subscriber key (A-key), which is never used alone in AUTH but is used only for generating one or more operating keys, e.g., S-keys and B-keys. The AUTH computes a new value for the rolling key which becomes the current value of the rolling key whenever the mobile station and the home network agree on an update. Such an update may be triggered, for example, by a request from the visited network or the home network for execution of a bilateral authentication procedure as further described below.

Bilateral Authentication

Bilateral authentication, i.e., authentication of both the mobile station and the network, may be distinguished from unilateral authentication in that the authentication information sent in both directions is key-dependent in the former, whereas only the information sent in the direction mobile station to network is key-dependent in the latter. According to FIG. 4, the RAND is used as an input to AUTH which generates a long response comprised of a RESP and a RESPBIS. The RESP is sent by the mobile station to the network to validate the mobile station and the RESPBIS is sent from the network to the mobile station to validate the network. The network transmits to the mobile station an authentication order or message which includes the RAND and the RESPBIS. The mobile station uses the RAND to compute a RESP and a RESPBIS in accordance with the AUTH and sends the internally generated RESP to the network only if the internally generated RESPBIS matches the RESPBIS received from the network. Otherwise, i.e., if the internally generated RESPBIS does not match the RESPBIS received from the network, the mobile station does not send the RESP to the network, but sends, instead, a confirmation or an acknowledgement (ACK) of receipt of the authentication order from the network. This prevents a false base station from extracting RAND, RESP pairs from the mobile station and the verification of the mobile station and network identities allows security status updating to proceed at a convenient later point in relative safety.

The primary and dual functions of bilateral authentication are to trigger a rolling key (B-key) update in both the mobile station and the home network while, at the same time, validating them to each other and, thus, preventing certain forms of false base station attacks on the security of the system. The former function, i.e., B-key update, may be separated from the latter function, i.e., reciprocal validation, by the use of a B-key step flag which may, for example, be sent from the network to the mobile station. The B-key step flag allows the network operator to selectively control, e.g., enable or disable, the updating of the B-key (and S-key) and may consist, for example, of a designated binary bit (1 or 0 value) contained in the authentication order or message. A new S-key for the next all and a new B-key for the next authentication are calculated by the mobile station only if the internally generated RESPBIS matches the RESPBIS received from the network and the B-key step flag is active, i.e., value set to 1. If the B-key step flag is inactive, i.e., value set to 0, the current B-key is saved and used for the next authentication and the current S-key is saved and used to cipher the next call.

In a typical bilateral authentication, the RAND value is determined by the home network and sent along with a RESPBIS to the visited network and, therefrom, to the mobile station. If the mobile station validates the RESPBIS, the mobile station will send a RESP to the visited network which sends the RESP to the home network for validation. The home network compares the RESP received from the visited network with the internally generated RESP and informs the visited network of the result. If the home network validates the RESP, the visited network will grant access to the mobile station. Further, if encryption is desired and the B-key step flag is active, the home network will send to the visited network a new S-key which may be used to encipher the next call.

Alternatively, and to minimize inter-network communications in the performance of bilateral authentication, the home network may initially send not only the RAND and RESPBIS, but also the RESP and S-key to the visited network which may then use the RESP and S-key received from the home network to, respectively, validate the RESP received from the mobile station and encipher subsequent calls where encryption is desired. In addition, the home network may send a plurality of successsive sets of RAND, RESP, RESPBIS, S-key and B-key step flag values to the visited network for use in a plurality of successive authentications. As discussed previously, however, it is more desirable, from a security standpoint, that the home network release the S-key only after, and not before, the RESP has been validated by the home network.

Call Counter

In addition to an authentication system for performing unilateral and bilateral authentication, the home network and the mobile station may include a call counter for tracking calls to and from the mobile station. Unlike the authentication system which is aimed at controlling fraud, the call counter is directed to monitoring or supervising the fraudulent use of network services. The call counter in the mobile station may be updated or incremented upon receipt of a call counter update message transmitted from the network to the mobile station. Similarly, the current value of the call counter in the mobile station may be sent to the network in a call counter retrieval message upon receipt of a request from the network.

To monitor fraudulent use, the network may compare the current value of the call counter received from the mobile station with the current value of the call counter in the network. Moreover, by examining the description and the sequence or logical progression of calls appearing in a mobile subscriber's bill, the mobile subscriber may be alerted to the existence of a fraudulent user which has, for example, stolen the MIN/ESN belonging to that mobile subscriber. In this respect, the call counter may be regarded as an independent fraud supervision means, distinct from the authentication system. There is no inherent linkage between the authentication messages and the call counter messages. The call counter, however, may be updated at the same time as the rolling key as illustrated below.

The rolling key update may be performed at any time during a conversation that the visited network decides to update the call counter in the home network and the mobile station. Before updating its call counter, the home network may request a bilateral authentication of the mobile station. A correct response from the mobile station would then result in a call counter update, a rolling key update and the generation of a new conversation key (S-key) which is sent to the visited network for use in subsequent calls. Similarly, the mobile station may update its call counter only if the bilateral authentication procedure verifies that the visited network is in genuine contact with the home network. Upon verification, the mobile station also updates its call counter and rolling key (B-key) and generates a new conversation key (S-key) for use in subsequent calls. It may be appreciated that, where the call counter and the rolling key are updated at the same time, a check of the mobile station and the home network call counters may also serve as an indication of whether the mobile station and home network are in the same rolling key state.

Relationship Between Encryption and Authentication

When enciphering of communication is desired in a visited network the ciphering key must be communicated from the home network to the visited network. As mentioned heretofore, it is highly undesirable for the secret subscriber A-keys to circulate between networks on non-specially protected links. Preferably, the home network never releases the A-key of a given subscriber but only uses the A-key to generate a temporary talk-variable (S-key) which is then used for enciphering a particular call or group of calls. The S-key is calculated and sent from the home network to the visited network upon receiving a MIN, a RAND and a RESP which are deemed valid. Since the S-key is calculated at the same time and by the same process as the RESP, successful authentication generally ensures that the network and the mobile station will have the same enciphering key (S-key) and, consequently, the enciphering of traffic or user data may begin as soon as authentication has been completed.

To illustrate the relationship between encryption and authentication, assume that encryption is enabled for a mobile station served by a visited network. The visited network periodically broadcasts a new RAND value to all mobile stations within its service area. Each of the mobile stations computes a response (RESP) which is sent along with MIN and, possibly, a call history parameter COUNT to the visited network. The visited network sends the current RAND value along with the MIN and RESP received from a particular mobile station to, and requests the enciphering key (S-key) from, the mobile station's home network. The home network compares the received RESP with the response it has obtained by applying RAND, A-key, B-key and ESN, for example, to AUTH and determines whether the mobile station is genuine whereupon the home network releases the temporary enciphering key (S-key) to the visited network. If the visited network does not receive an enciphering key, the visited network may deny service to the mobile station.

If the visited network grants access and assigns a TDMA channel to the mobile station, the parameters defining that channel, i.e., frequency, timeslot and DVCC, are sent from the visited network to the mobile station which tunes to the allocated traffic channel. Thereafter, the visited network and the mobile station may communicate in the enciphered mode using the S-key. The visited network may send its frame counter value over the unencrypted SACCH and may also send frame count synchronization messages in a number of FACCH messages as described in the co-pending patent application Ser. No. 07/556,102, entitled "Continuous Cipher Synchronization for Cellular Communication System", referred to above. Further exchanges of FACCH signalling or traffic take place in the enciphered mode.

Once the mobile station and the visited network have established communication on the traffic channel, the visited network may, at any time, request the execution of bilateral authentication and rolling key and call counter update by sending to the mobile station a RAND and a RESPBIS received from the home network and activating the B-key step flag. The mobile station uses the RAND, ESN, A-key and B-key in AUTH to generate the expected RESP and RESPBIS. IF the internally generated RESPBIS agrees with the received RESPBIS, the mobile station sends the RESP to the visited network. The visited network sends RESP to the home network and, if the home network's internally generated RESP agrees with the received RESP, a newly calculated call variable or S-key may be sent from the home network to the visited network. The visited network stores the new S-key for use in future calls involving the visiting mobile station. The present call continues to be enciphered with the old S-key. Upon handover or call termination, the new S-key may come into use.

Asynchronism of Rolling Key or B-key

Authentication of a valid (non-fraudulent) mobile station in accordance with FIG. 4 requires that the same B-key input be used by both the mobile station and the network to generate the corresponding values of the RESP. For a variety of reasons, however, the B-key used by the valid mobile station may fall out of synchronization with the B-key used by the network. In the execution of bilateral authentication, for example, the RAND and RESPBIS generated by the network may be lost during transmission and never received by the mobile station which, therefore, fails to perform a B-key update. Furthermore, beaus the B-key, unlike the A-key, is not fixed or "hardwired," but is instead a changeable content of an electronic circuit, a variety of hardware-related problems, such as electromagnet interference, switch failure, etc., may damage or completely destroy the value of the B-key in either the mobile station or the network leading to a loss of B-key synchronization between them.

Where technic difficulties cause asynchronization of the B-key between the mobile station and the network, the RESP of a valid mobile station will not match the RESP generated by the network and the authentication will fail even though the mobile station is not fraudulent. A mechanism is, therefore, needed to distinguish between a fraudulent mobile station and, for example, a valid but malfunctioning mobile station or, more generally, a valid mobile station using a B-key which, for one reason or another, has deviated from the B-key used by the network in the authentication of the mobile station.

Partitioning of RESP

Figure 5:
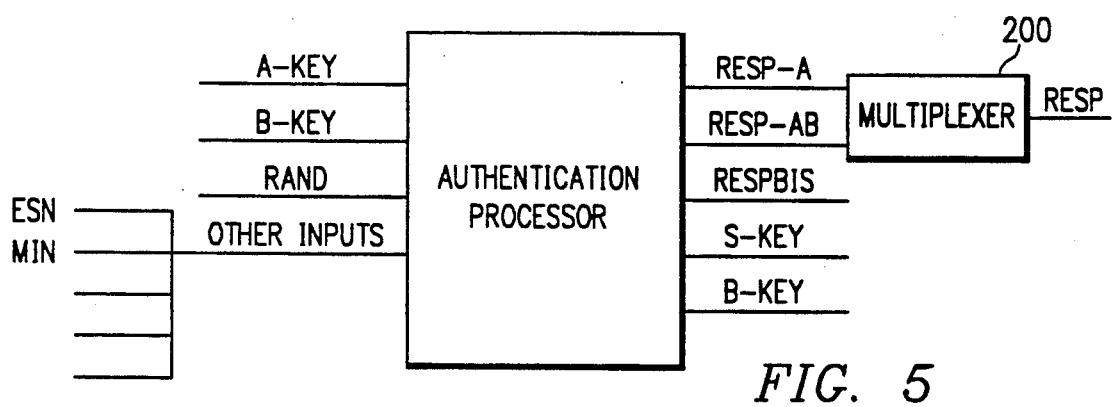
FIG. 5 is a pictorial representation of an authentication system constructed in accordance with the present invention.

-Referring now to FIG. 5, an authentication system constructed in accordance with the present invention may now be seen. The inputs to and outputs from the authentication system of FIG. 5 are similar to those of the authentication system pictured in FIG. 4, exempt that, unlike the response in FIG. 4 which is dependent on both the A-key and the B-key (and the other inputs, if any), the response in FIG. 5 has been divided into a first response portion RESP-A, which is dependent on the fixed A-key (and the other inputs, if any) but not the changeable B-key, and a second response portion RESP-AB, which is dependent on the B-key but not the A-key or, preferably, on both the A-key and the B-key (and the other inputs, if any). The RESP-A and RESP-AB may be sent in the form of discrete responses from the mobile station to the network or may be combined, e.g., multiplexed in a multiplexer 200, to form the total response (RESP) which is sent from the mobile station to the network. In either event, since RESP-A is independent of the B-key, the network can authenticated a valid mobile station even if the B-key used by the valid mobile station has fallen out of synchronization with the B-key used by the network. In such instance, although the RESP-AB transmitted by the mobile station will not match the RESP-AB internally generated by the network, there will, nevertheless, be a match of the RESP-A and the authentication will succeed despite the onset of B-key asynchronization.

The virtues of the present invention may be further illustrated by considering the authentication possibilities in the absence and then presence of the present invention. Without the present invention, the comparison of responses by the network will procure either a full match or a total mismatch (no-match). In the case of a valid mobile station using a damaged, malfunctioning or otherwise unsynchronized B-key, the comparison of responses by the network will yield a no-match and may result in denial of service to the valid mobile station since the network cannot distinguish between a malfunctioning valid mobile station and a fraudulent mobile station using, for example, ESN tumbling. With the present invention, however, there is the additional possibility of recognizing a partial (RESP-A) match between the responses compared by the network where B-key asynchronization has occurred. Moreover, the present invention allows the network to distinguish between traditional fraudulent users which rely, for example, on the tumbling of MIN/ESN or similar non-cloning techniques, and procure no-match responses, and advanced fraudulent users or clones which rely, instead, on the copying of the memory contents, including the A-key and B-key, of a valid mobile station and produce partial match or full match responses. In effect, the authentication system of the present invention provides either a full authentication or a partial or limited authentication of the mobile station. The possible outcomes for the comparison of responses according to the present invention and some typical reasons (sources) therefor are listed below:

1. No-match: a fraudulent mobile station using ESN tumbling or other non-cloning fraudulent techniques.
2. Partial match:
   (a) a valid mobile station using a damaged malfunctioning or otherwise unsynchronized B-key.
   (b) a clone after the valid mobile station has performed a B-key update (through bilateral authentication, for example).
   (c) a valid mobile station after a clone has performed a B-key update.
3. Full match:
   (a) a valid mobile station using a synchronized B-key.
   (b) a clone where no B-key updating has theretofore been performed
   (c) a clone where the B-key of the valid mobile station has not been updated since the cloning process As will be understood from the above listing and prior discussion, by comparing the RESP-A portion of the response (RESP), the network can distinguish between a valid mobile station and a non-clone (ESN tumbling, etc.) fraudulent user even where the B-key is out of synchronization. In addition, by comparing the RESP-AB portion of the response, the network can detect that a clone exists and take corrective action as necessary. It should also be clear from the foregoing that RESP-A and RESP-AB may be calculated in various ways and later combined to form the composite RESP in accordance with the the operation of the present invention so long as RESP-A is independent of the B-key and both the RESP-A and RESP-AB portions of RESP are identifiable or may be ascertained from the RESP. Preferably, however, the constituent bits of RESP-A are not mathematically combined, e.g., X-ORed, to the constituent bits of RESP-AB, but are simply appended or multiplexed together to form the RESP which may then be demultiplexed to recover RESP-A and RESP-AB. Moreover, the specific proportions of RESP-A and RESP-AB contained in the RESP may be varied to accommodate a particular message length and format. Thus, for example, the RESP may consist of any one of the following illustrative combinations:

1. All of RESP-A and all of RESP-AB
2. One half of RESP-A and one half of RESP-AB.
3. X% of RESP-A and Y% of RESP-AB where X,Y is any number between 0 and 100.

It will be readily appreciated by those of ordinary skill in the art that the authentication system of the present invention, including the A-key dependent RESP-A output and the B-key (and, preferably also, A-key) dependent RESP-AB output, may be used for authentication on the analog control channel (ACC), the analog voice channel (AVC) and/or the digital traffic channel (DTC) at call set-up, mobile registration or during conversation and with or without encryption. It will be further appreciated that the A-key and B-key dependency of the other outputs of the authentication system, e.g., RESPBIS, S-key and B-key, may also be manipulated to effect the goals of the network operator. By way of illustration only, the RESPBIS may be made dependent on the A-key only thereby allowing the successful authentication of a valid base station despite B-key asynchronization. The S-key may, on the other hand, may be dependent on both the A-key and B-key while the new value of the B-key may be dependent on the current value of the B-key.

Exemplary AUTH

Described below is an exemplary authentication algorithm which may be used to implement the teachings of the present invention as set forth hereinabove. It should be emphasized that, as pointed out previously, a variety of authentication algorithms may be used for this purpose and the particular algorithm AUTH illustrated and discussed below is only one of a great many. In the description which follows, certain byte counts have been chosen for certain input and output variables of the AUTH. It should be clearly understood, however, that such byte counts are exemplary only and are not intended and should not be construed as a limitation on the general use or applicability of AUTH. For example, the bit or byte lengths of RESP, RESPBIS and even RAND may change depending on which channel, e.g., analog control channel (ACC), analog voice channel (AVC), digital control channel (DCC) or digital traffic channel (DTC), is selected for the performance of unilateral or bilateral authentication. Such variations can be readily accommodated by the exemplary AUTH discussed hereinafter.

The exemplary AUTH uses a total of 32 bytes of input variables and generates 32 bytes of output variables. This is achieved by two applications of an algorithm which uses 16 bytes of input variables and generates 16 bytes of output variables The input variables are:

| | |
|---|---|
| RAND: Provision is made for up to 4 bytes | NON-SECRET VARIABLES |
| ESN: Provision is made for up to 4 bytes | |
| Ka: 12 bytes of the permanent key (A-key) | SECRET VARIABLES |
| Kb: 12 bytes of the rolling key (B-key) | |

The 32 output bytes are designated for use as follows:

| | |
|---|---|
| 0–3: | Authentication response (RESP) |
| 4–7: | RESPBIS (needed for bilateral authentication) |
| 8–12: | Information mask (if used) |
| 13–23: | Next Kb (if key update occurs) |
| 24–31: | Talk variable for enciphering call (S-key) |

The 32 bytes of input to the algorithm are split into groups of 16 bytes which are then used in the first application of the algorithm to produce a first 16 bytes of output (bytes 0–15). The 32 bytes of input are then split in a different way and used in the second application of the algorithm to produce a second 16 bytes of output (bytes 16–31).

The algorithm is adapted for very efficient and fast execution on simple microprocessors of the type used in cellular radio telephones. Recursive use of a small inner code loop serves to confine the code within a 100-byte region. The outer loop consists of iteratively executing a mixing process six times. The mixing process is illustrated in FIG. 6.

Figure 6:
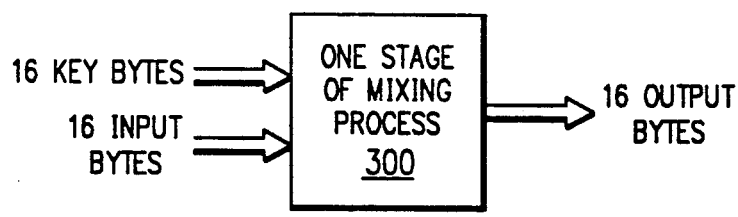
FIG. 6 is a schematic block diagram of the mixing process used in an exemplary authentication algorithm for the present invention.

Referring now to FIG. 6, there is shown therein a schematic block diagram of the mixing process used in the exemplary authentication algorithm for the present invention. The mixing process 300 is provided with a first input of 16 key bytes and a second input of 16 input bytes. The 16 input bytes to the first iteration consist of the 4 bytes of ESN, 4 bytes of RAND and the 8 rolling key bytes Kb(0–7), in the following order:

| | |
|---|---|
| ESN | 4 bytes |
| RAND | 4 bytes |
| Kb(1) | |
| Kb(2) | |
| Kb(3) | |
| Kb(4) | |
| Kb(5) | |
| Kb(6) | |
| Kb(7) | |
| Kb(0) | |

The 16 key bytes which are provided as input to each iteration of the mixing process are a cyclic selection from the 8 rolling key bytes Kb(0–7) and the 16 permanent key bytes Ka(0–15). In the first application of the algorithm, the order of use of the 16 key bytes may be as follows:

| Iteration number | Key bytes used |
|---|---|
| 1 | Ka(0) → Ka(15) |
| 2 | Kb(0) → Kb(7); Ka(0) → Ka(7) |
| 3 | Ka(8) → Ka(15); Kb(0) → Kb(7) |
| 4 | Kb(4) → Kb(7); Ka(0) → Ka(11) |
| 5 | Ka(4) → Ka(11); Kb(0) → Kb(3) |
| 6 | Ka(0) → Ka(12); Kb(0) → kb(2) |

The above key sequences may be obtained simply by copying the key variables to a temporary memory area in the order Kb, Ka, Kb again, and selecting them sequentially from this memory starting at the appropriate place for each iteration.

The mixing process 300 combines the 16 key bytes and the 16 input bytes in pairs using, for example, byte-wide add instructions. The mixing process 300 also uses a random 1:1 substitution box or look-up table, referred to hereinafter as an S-Box, to convert a one byte value to another one byte value. An exemplary 1:1 S-Box which may be implemented by a 256-byte read-only memory (ROM) is set forth in the co-pending U.S. patent application 07/586,890 entitled "Authentication System For Digital cellular communications". A 1:1 S-box means that every 8-bit input value produces a unique 8-bit output value, or stated differently, every possible 8-bit value occurs only once in the look up table.

Figure 7:
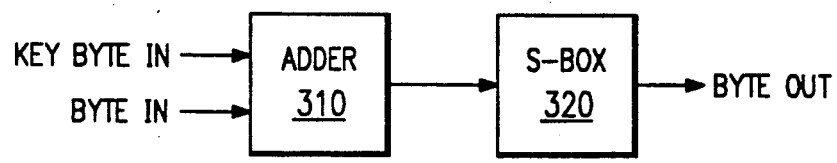
FIG. 7 is a schematic block diagram of a building block or mixing cell of the mixing process shown in FIG. 6.

Referring next to FIG. 7, a schematic block diagram of a building block or mixing cell of the mixing process 300 may now be seen. The mixing process 300 may be generally constructed from a plurality of mixing cells or inner loops of the type shown in FIG. 7. The particular mixing process 300 shown in FIG. 6 may be visualized as a vertical stack of 16 such mixing cells. Each of the cells is provided with one key byte and one input byte which are added together by an adder 310. The output of the adder 310 is used to address the contents of an S-box 320 which releases an output byte stored at the address defined by the output of the adder 310. A software implementation of a substantially similar mixing cell or inner loop is set forth in the copending U.S. patent application 07/556,890, entitled "Authentication System For Digital cellular communications".

The first application of the algorithm generates a first group of 16 output bytes, a part of which (bytes 0–7) may be used for the RESP and RESPBIS. The value of RESP (and RESPBIS) will depend on both the A-key and the B-key. In accordance with the present invention, however, the RESP should be partitioned into a first response portion RESP-A, which is dependent on the A-key but not the B-key, and a second response portion RESP-AB, which is dependent on both the A-key and the B-key. To generate the RESP-A, the current value of the B-key is stored and the B-key is set to an arbitrary value known to both the mobile station and the network. The arbitrary value need not be a fixed number, but may be a dynamic number such as, for example, an indication of the particular frequency or time slot assigned by the network to the mobile station. With the B-key set to the arbitrary value, the first application of the algorithm is run a first time and a first RESP value is obtained and stored. This first RESP will depend on the fixed A-key and the known B-key and may be used as the source for RESP-A. The current value of the B-key is then retrieved and the first application of the algorithm is run a second time with the B-key set to the current value and a second RESP value is obtained and stored. This second RESP value will depend on both the fixed A-key and the current B-key and may be used as the source for RESP-AB.

It will be recognized that if all the bytes of the first RESP are used to form RESP-A and all the bytes of the second RESP are used to from RESP-B, the byte-length of the RESP which is the combination of RESP-A and RESP-AB will double, in the present context, from four bytes to eight bytes. To preserve a maximum RESP length, only some of the bits of each of the first RESP (RESP-A) and the second RESP (RESP-AB)

may be used to form the combined RESP. Generally speaking, there is no limitation on the number of bits or bytes which are selected from the first RESP and second RESP so long as at least one or more bits or bytes are selected from each. Thus, for example, half of the first RESP and half of the second RESP or, alternatively, one fourth of the first RESP and three fourths of the second RESP, etc. are appended to each other or multiplexed together to form the total RESP.

The second application of the algorithm generates a second group of 16 output bytes which may be used for the conversation key (S-key), and, if performed, the updating of the rolling key (B-key). The second application of the algorithm is exactly the same as the first application except for the order in which the key bytes and input bytes are used. In the second application of the algorithm, the order of use of the 16 key bytes may be as follows:

| Iteration number | Key bytes used |
| --- | --- |
| 1 | Kb(0) → Kb(7); Ka(0) → Ka(7) |
| 2 | Ka(8) → Ka(15); Kb(0) → Kb(7) |
| 3 | Kb(4) → Kb(7); Ka(0) → Ka(11) |
| 4 | Ka(4) → Ka(11); Kb(0) → Kb(3) |
| 5 | Ka(0) → Ka(15) |
| 6 | Ka(3) → Ka(15); Kb(0) → Kb(2) |

Additionally, the 16-byte input array may be initialized using Ka bytes instead of Kb bytes as follows:

ESN(0)
ESN(1)
ESN(2)
ESN(3)
RAND(0)
RAND(1)
RAND(0)
RAND(1)
Ka(0)
Ka(1)
Ka(2)
Ka(3)
Ka(4)
Ka(5)
Ka(6)
Ka(7)

After executing all six iterations of the second application of the algorithm, the second 8 bytes appearing in the 16-byte input array are used as the temporary enciphering variable (S-key) and the first 8 bytes become the next rolling key variable if an update of the rolling key is performed. In the event of a rolling key update, the first 8 output bytes overwrite the old rolling bytes in the order Kb(1), Kb(2), Kb(3), Kb(4), Kb(5), Kb(6), Kb(7), Kb(0).

As discussed above, the current value of the rolling key (B-key), which is used in the second application of the algorithm to generate a new value for the B-key and S-key, may fall out of synchronization between the mobile station and the network. Asynchronization of the B-key inherently leads to the asynchronization of the S-key and, consequently, to a failure of encryption. While partitioning of the RESP, as has been described herein, overcomes certain authentication difficulties associated with B-key asynchronization, a mechanism is needed to resynchronize the B-key and S-key and to restore the network's ability to carry on encrypted communications. Such a mechanism may be seen in the related co-pending U.S. patent application Ser. No. 07/704,133, entitled "Rolling Key Resynchronization in Cellular Verification and Validation System", referred to above.

The foregoing description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention as defined in the following claims.

What is claimed is:

1. A method for the generation of parameters used in enhancing the security of communication in a communications network in which a mobile station is assigned a unique multi-digit permanent key and is also associated with a changeable multi-digit rolling key, said method comprising:

receiving at a location in each of the mobile station and the network a plurality of multi-digit input signals including a signal representative of an authentication inquiry by the network, along with the multi-digit permanent key of the mobile station and the multi-digit rolling key associated with said mobile station at that particular time;

arranging at least some of the digits of said input signals in a first grouping;

calculating from said first grouping of input signals and said permanent key digits a first output value in accordance with a first algorithm;

selecting from blocks of at least some of the digits comprising said first output value a first set of parameters used within said network including a first authentication response to be used by said mobile station to replay to the authentication inquiry by the network;

arranging at least some of the digits of said input signals in a second grouping;

calculating from said second grouping of input signals and said permanent and rolling key digits a second output value in accordance with a second algorithm;

selecting from blocks of at least some of the digits comprising said second output value a second set of parameters used within said network including a second authentication response used by the mobile station to reply to the authentication inquiry by the network; and combining said first and second authentication responses into a single authentication response signal.

2. A method for the generation of parameters used in enhancing the security of communication in a communications network as set forth in claim 1 wherein said first and second groupings include the same arrangement of digits.

3. A method for the generation of parameters used in enhancing the security of communication in a communications network as set forth in claim 1 wherein said first and second algorithms are the same.

4. A method for the generation of parameters used in enhancing the security of communication in a communications network as set forth in claim 1 wherein said first calculation includes, along with the digits of said permanent key, the digits of a preselected value having the same number of digits as said rolling key.

5. A method for the generation of parameters used in enhancing the security of communication in a communications network as set forth in claim 1 wherein said single authentication response signal is formed by multiplexing said first and second authentication responses together.

6. A method for the generation of parameters used in enhancing the security of communication in a communications network as set forth in claim 1 wherein said single authentication signal includes the same number of digits as both said first and second authentication responses.

7. A method for the generation of parameters used in enhancing the security of communication in a communications network as set forth in claim 6 wherein said single authentication signal is formed by combining one half of the first authentication response and one half of the second authentication response.

8. A system for the generation of parameters used in enhancing the security of communication in a communications network in which a mobile station is assigned a unique multi-digit permanent key and is also associated with a changeable multi-digit rolling key, said system comprising:

means for receiving at a location in each of the mobile station and the network a plurality of multi-digit input signals including a signal representative of an authentication inquiry by the network, along with the multi-digit permanent key of the mobile station and the multi-digit rolling key associated with said mobile station at that particular time;

means for arranging at least some of the digits of said input signals in a first grouping;

means for calculating from said first grouping of input signals and said permanent key digits a first output value in accordance with a first algorithm;

means for selecting from blocks of at least some of the digits comprising said first output value a first set of parameters used within said network including a first authentication response to be used by said mobile station to reply to the authentication inquiry by the network;

means for arranging at least some of the digits of said input signals in a second grouping;

means for calculating from said second grouping of input signals and said permanent and rolling key digits a second output value in accordance with a second algorithm;

means for selecting from blocks of at least some of the digits comprising said second output value a second set of parameters used within said network including a second authentication response used by the mobile station to reply to the authentication inquiry by the network; and means for combining said first and second authentication responses into a single authentication response signal.

9. A system for the generation of parameters used in enhancing the security of communication in a communications network as set forth in claim 8 wherein said first and second groups include the same arrangement of digits.

10. A system for the generation of parameters used in enhancing the security of communication in a communications network as set forth in claim 8 wherein said first and second algorithms are the same.

11. A system for the generation of parameters used in enhancing the security of communication in a communications network as set forth in claim 8 wherein said first calculation includes, along with the digits of said permanent key, the digits of a preselected value having the same number of digits as said rolling key.

12. A system for the generation of parameters used in enhancing the security of communication in a communications network as set forth in claim 8 wherein said single authentication response signal is formed by multiplexing said first and second authentication responses together.

13. A system for the generation of parameters used in enhancing the security of communication in a communications network as set forth in claim 8 wherein said single authentication signal includes the same number of digits as both said first and second authentication responses.

14. A system for the generation of parameters used in enhancing the security of communication in a communications network as set forth in claim 13 wherein said single authentication signal is formed by combining one half of the first authentication response and one half of the second authentication response.

15. A method for the generation of parameters used in the authentication of a mobile station to a communications network wherein the mobile station is assigned a unique multi-digit permanent key and is also associated with a changeable multi-digit rolling key, both said permanent key and said rolling key being accessible to said mobile station and the network, and wherein a limited degree of authentication of the mobile station is achieved even when the value of said rolling key accessed by the mobile station is different from the value of the rolling key accessed by the network, said method comprising:

providing in each of the mobile station and the network a plurality of multi-digit input signals including a signal representative of an authentication inquiry by the network, along with the multi-digit permanent key of said mobile station and the multi-digit rolling key associated with said particular mobile station at that particular time;

arranging at least some of the digits of said input signals in a grouping;

calculating from said grouping of input signals and said permanent key digits a first output value in accordance with an algorithm;

selecting from blocks of at least some of the digits comprising said first output value a first set of parameters used within said network including a first authentication response to be used by said mobile station to reply to the authentication inquiry by the network;

calculating from said grouping of input signals and both said permanent key and said rolling key digits a second output value in accordance with said algorithm;

selecting from blocks of at least some of the digits comprising said second output value a second set of parameters used within said network including a second authentication response used by the mobile station to reply to the authentication inquiry by the network; and grouping said first and second authentication responses into a single authentication response signal for enabling authentication of the mobile station to the network when both the permanent and rolling keys accessed by the mobile station and the network, respectively, are identical, and limited authentication when only the respective permanent keys are identical.

16. A method for the generation of parameters used in the authentication of a mobile station to a communications network as set forth in claim 15 wherein said calculation to obtain said first output value includes, along with the digits of said permanent key, the digits of a preselected value having the same number of digits as said rolling key.

17. A method for the generation of parameters used in the authentication of a mobile station to a communications network asset forth in claim 15 wherein said single authentication response signal is formed by multiplexing said first and second output values together.

18. A method for the generation of parameters used in the authentication of a mobile station to a communications network as set forth in claim 15 wherein said single authentication signal includes the same number of digits as both said first and second output values.

19. A method for the generation of parameters used in the authentication of a mobile station to a communications network as set forth in claim 18 wherein said single authentication signal is formed by combining one half of said first output value and one half of the second output value.

20. A system for the generation of parameters used in the authentication of a mobile station to a communications network wherein the mobile station is assigned a unique multi-digit permanent key and is also associated with a changeable multi-digit rolling key, both said permanent key and said rolling key being accessible to said mobile station and the network, and wherein a limited degree of authentication of the mobile station is achieved even when the value of said rolling key accessed by the mobile station is different from the value of the rolling key accessed by the network, said system comprising:

means for providing in each of the mobile station and the network a plurality of multi-digit input signals including a signal representative of an authentication inquiry by the network, along with the multi-digit permanent key of said mobile station and the multi-digit rolling key associated with said particular mobile station at that particular time;

means for arranging at least some of the digits of said input signals in a grouping;

means for calculating from said grouping of input signals and said permanent key digits a first output value in accordance with an algorithm;

means for selecting from blocks of at least some of the digits comprising said first output value a first set of parameters used within said network including a first authentication response used by said mobile station to reply to the authentication inquiry by the network;

means for calculating from said grouping of input signals and both said permanent key and said rolling key digits a second output value in accordance with said algorithm;

means for selecting from blocks of at least some of the digits comprising said second output value a second set of parameters used within said network including a second authentication response used by the mobile station to reply to the authentication inquiry by the network; and means for grouping said first and second authentication responses into a single authentication response signal for enabling authentication of the mobile station to the network when both the permanent and rolling keys accessed by the mobile station and the network, respectively, are identical, and limited authentication when only the respective permanent keys are identical.

21. A system for the generation of parameters used in the authentication of a mobile station to a communications network as set forth in claim 20 wherein said calculation to obtain said first output value includes, along with the digits of said permanent key, the digits of a preselected value having the same number of digits as said rolling key.

22. A system for the generation of parameters used in the authentication of a mobile station to a communications network as set forth in claim 20 wherein said single authentication response signal is formed by multiplexing said first and second output values together.

23. A system for the generation of parameters used in the authentication of a mobile station to a communications network as set forth in claim 20 wherein said single authentication signal includes the same number of digits as both said first and second output values.

24. A system for the generation of parameters used in the authentication of a mobile station to a communications network as set forth in claim 23 wherein said single authentication signal is formed by combining one half of said first output value and one half of the second output value.

25. A method of authenticating a mobile station within a radio network by providing two degrees of authentication, a full authentication and a partial authentication, said method comprising:

providing in each of the mobile station and the network, a unique multi-digit permanent key and a multi-digit changeable rolling key;

sending an authentication inquiry signal from the network to the mobile station and an identification signal from the mobile station to the network;

calculating in each of the mobile station and the network a first authentication response value from an algorithm based upon input values which include the authentication inquiry signal, the identification signal, and the permanent key;

calculating in each of the mobile station and the network a second authentication response value from said algorithm based upon input values which include the authentication inquiry signal, the identification signal, and both the permanent key and the rolling key;

joining in each of the mobile station and the network at least some parts of each of said first and second authentication response values to form a composite authentication response signal having a first and a second portion;

sending the composite authentication response signal formed in the mobile station to the network;

comparing the composite authentication response signal formed in the mobile station with the composite authentication response signal formed in the network; and detecting a full authentication of the mobile station to the network in response to an indication that both the first and second portions of the composite authentication response signals formed in each of the mobile station and the network, respectively, are identical, and detecting a partial authentication of the mobile station to the network in response to an indication that only the first portions of the composite authentication response signals formed in each of the mobile station and the network, respectively, are identical.

26. A method of authenticating a mobile station within a radio network as set forth in claim 25 wherein said calculation to obtain said first authentication response value includes, along with the digits of said permanent key, the digits of a preselected value having the same number of digits as said rolling key.

27. A method of authenticating a mobile station within a radio network as set forth in claim 25 wherein said composite authentication response signal is formed in each of the mobile station and the network by multiplexing said first and said second authentication response value together.

28. A method of authenticating a mobile station within a radio network as set forth in claim 25 wherein said composite authentication signal formed in each of the mobile station and the network includes the same number of digits as both said first and second authentication response values.

29. A method of authenticating a mobile station within a radio network as set forth in claim 25 wherein said composite authentication signal is formed in each of the mobile station and the network by combining one half of said first authentication response value and one half of the second authentication response value.

30. A method of authenticating a mobile station within a radio network as set forth in claim 25 wherein said mobile station is associated with a home network and said radio network is a visited network and wherein:

said calculating steps performed within said network are performed under control of the home network of said mobile station.

31. A method of authenticating a mobile station within a radio network as set forth in claim 25 in which said calculations to obtain said first authentication response value are performed with said permanent key along with a preselected value having the same number of digits as said rolling key and being incorporated into said algorithm in the same way the calculations to obtain said second authentication response value incorporate said rolling key.

32. A method of authenticating a mobile station within a radio network as set forth in claim 25 wherein the network identifies a mobile station as a possibly fraudulent clone in response to the detection of a partial authentication of the mobile station.

33. A system for authenticating a mobile station within a radio network by providing two degrees of authentication, a full authentication and partial authentication, said system comprising:

means for providing in each of the mobile station and the network, a unique multi-digit permanent key and a multi-digit changeable rolling key;

means for sending an authentication inquiry signal from the network to the mobile station and an identification signal from the mobile station to the network;

means for calculating in each of the mobile station and the network a first authentication response value from an algorithm based upon input values which include the authentication inquiry signal, the identification signal, and the permanent key;

means for calculating in each of the mobile station and the network a second authentication response value from said algorithm based upon input values which include the authentication inquiry signal, the identification signal, and both the permanent key and the rolling key;

means for joining in each of the mobile station and the network at least some parts of each of said first and second authentication response values to form a composite authentication response signal having a first and a second portion;

means for sending the composite authentication response signal formed in the mobile station to the network;

means for comparing the composite authentication response signal formed in the mobile station with the composite authentication response signal formed in the network; and means for detecting a full authentication of the mobile station to the network in response to an indication that both the first and second portions of the composite authentication response signals formed in each of the mobile station and the network, respectively, are identical, and detecting a partial authentication of the mobile station to the network in response to an indication that only the first portions of the composite authentication response signal formed in each of the mobile station and the network, respectively, are identical.

34. A system for authenticating a mobile station within a radio network as set forth in claim 33 wherein said calculation to obtain said first authentication response value includes, along with the digits of said permanent key, the digits of a preselected value having the same number of digits as said rolling key.

35. A system for authenticating a mobile station within a radio network as set forth in claim 33 wherein said composite authentication response signal is formed in each of the mobile station and the network by multiplexing said first and second authentication response value together.

36. A system for authenticating a mobile station within a radio network as set forth in claim 33 wherein said composite authentication signal formed in each of the mobile station and the network includes the same number of digits as both said first and second authentication response values.

37. A system for authenticating a mobile station within a radio network as set forth in claim 33 wherein said composite authentication signal is formed in each of the mobile station and the network by combining one half of said first authentication response value and one half of the second authentication response value.

38. A system for authenticating a mobile station within a radio network as set forth in claim 33 wherein said mobile station is associated with a home network and said radio network is a visited network and wherein:

said means for calculating within said network are under control of the home network of said mobile station.

39. A system for authenticating a mobile station within a radio network as set forth in claim 33 in which said calculations to obtain said first authentication response value are performed with said permanent key along with a preselected value having the same number of digits as said rolling key and being incorporated into said algorithm in the same way the calculations to obtain said second authentication response value incorporate said rolling key.

40. A system for authenticating a mobile station within a radio network as set forth in claim 33 wherein the network identifies a mobile station as a possibly fraudulent clone in response to the detection of a partial authentication of the mobile station.

41. A method for the validation of a mobile station in a radio network in accordance with an authentication algorithm executed in each of said mobile station and said network, said method comprising the steps of:

transmitting a random challenge signal from said network to said mobile station;

applying to said authentication algorithm a set of inputs including said random challenge signal transmitted from said network to said mobile station, and a fixed key value and a changeable key value;

generating from said authentication algorithm a set of outputs including a first response signal which is dependent on said fixed key value and independent of said changeable key value, and a second response signal which is dependent on said changeable key value;

transmitting the first and second response signals from said mobile station to said network;

comparing said first and second response signals transmitted from said mobile station to said network with the first and second response signals generated in said network; and determining the validity of said mobile station based on whether there is a full match, partial match or no match between said first and second response signals transmitted from said mobile station to said network and the first and second response signals generated in said network.

42. The method of claim 41 wherein said set of inputs further includes the electronic serial number of said mobile station.

43. The method of claim 41 wherein said set of inputs further includes the mobile identification number of said mobile station.

44. The method of claim 41 wherein said set of outputs further includes a temporary encryption key value which is used to encipher communications between said mobile station and said network.

45. The method of claim 41 wherein said first and second response signals generated in said mobile station are combined prior to being transmitted to said network.

46. The method of claim 45 wherein only a portion of each of said first and second response signals generated in said mobile station is selected for transmission to said network and wherein said portion of each is multiplexed with the other portion prior to being transmitted to said network.

47. The method of claim 41 wherein said set of outputs further includes a third response signal and said method further comprises the steps of:

transmitting the third response signal generated in said network to said mobile station;

comparing said third response signal generated in said network and received in said mobile station with the third response signal generated in said mobile station; and transmitting said first and second response signals generated in said mobile station to said network only if said third response signal generated in said network and received in said mobile station matches said third response signal generated in said mobile station.

48. The method of claim 47 wherein said set of outputs further includes a new changeable key value and said method further comprises the steps of:

transmitting from said network to said mobile station a signal indicative of changeable key value update; and replacing the current changeable key value with said new changeable key value in response to said update signal.

49. The method of claim 48 wherein said random challenge signal, said third response signal generated in said network and said update signal are transmitted together in one message to said mobile station.

50. The method of claim 41 wherein said set of outputs further includes a new changeable key value and said method further comprises the steps of:

transmitting from said network to said mobile station a signal indicative of changeable key value update; and replacing the current changeable key value with said now changeable key value in response to said update signal.

51. A system for the validation of a mobile station in a radio network in accordance with an authentication algorithm executed in each of said mobile station and said network, said system comprising:

means for transmitting a random challenge signal from said network to said mobile station;

means for applying to said authentication algorithm a set of inputs including said random challenge signal transmitted from said network to said mobile station, and a fixed key value and a changeable key value;

means for generating from said authentication algorithm a set of outputs including a first response signal which is dependent on said fixed key value and independent of said changeable key value, and a second response signal which is dependent on said changeable key value;

means for transmitting the first and second response signals generated in said mobile station to said network;

means for comparing said first and second response signals generated in said mobile station and received in said network with the first and second response signals generated in said network; and means for determining the validity of said mobile station based on whether there is a full match, partial match or no match between said first and second response signals transmitted from said mobile station to said network and the first and second response signals generated in said network.

52. The system of claim 51 wherein said set of inputs further includes the electronic serial number of said mobile station.

53. The system of claim 51 wherein said set of inputs further includes the mobile identification number of said mobile station.

54. The system of claim 51 wherein said set of outputs further includes a temporary encryption key value which is used to encipher communications between said mobile station and said network.

55. The system of claim 51 wherein said first and second response signals generated in said mobile station are combined prior to being transmitted to said network.

56. The system of claim 55 wherein only a portion of each of said first and second response signals generated in said mobile station is selected for transmission to said network and wherein said portion of each is multiplexed with the other portion prior to being transmitted to said network.

57. The system of claim 51 wherein said set of outputs further includes a third response signal and said system further comprises:
 means for transmitting the third response signal generated in said network to said mobile station;
 means for comparing said third response signal generated in said network and received in said mobile station with the third response signal generated in said mobile station; and
 means for transmitting said first and second response signals generated in said mobile station to said network only if said third response signal generated in said network and received in said mobile station matches said third response signal generated in said mobile station.

58. The system of claim 57 wherein said set of outputs further includes a new changeable key value and said system further comprises:
 means for transmitting from said network to said mobile station a signal indicative of changeable key value update; and
 means for replacing the current changeable key value with said new changeable key value in response to said update signal.

59. The system of claim 58 wherein said random challenge signal, said third response signal generated in said network and said update signal are transmitted together in one message to said mobile station.

60. The system of claim 51 wherein said set of outputs further includes a new changeable key value and said system further comprises:
 means for transmitting from said network to said mobile station a signal indicative of changeable key value update; and
 means for replacing the current changeable key value with said new changeable key value in response to said update signal.

61. A method for validating a remote station to a radio network comprising the steps of:
 generating in each of said station and said network a first validation value from a fixed key value and a second validation value from a changeable key value;
 transmitting from said station to said network at least a portion of each of the first and second validation values generated in said station; and
 comparing the transmitted portions of the first and second validation values generated in said station with corresponding portions of the first and second validation values generated in said network to determine the validity of said station.

62. The method of claim 61 wherein the second validation value is generated from both said fixed key value and said changeable key value.

63. The method of claim 61 wherein said transmitted portions are multiplexed into a composite validation value prior to transmission to said network.

64. The method of claim 61 wherein the first validation value is generated from other values in addition to said fixed key value.

65. The method of claim 61 wherein the second validation value is generated from other values in addition to said changeable key value.

66. A radio network comprising at least one exchange connected to at least one base station which communicates with at least one mobile station, and further comprising:
 means for generating in each of said mobile station and said network a first validation value from a fixed key value and a second validation value from a changeable key value;
 means for transmitting from said mobile station to said network at least a portion of each of the first and second validation values generated in said mobile station; and
 means for comparing the transmitted portions of the first and second validation values generated in said mobile station; and
 means for comparing the transmitted portions of the first and second validation values generated in said mobile station with corresponding portions of the first and second validation values generated in said network to determine the validity of said mobile station.

67. The network of claim 66 wherein the second validation value is generated from both said fixed key value and said changeable key value.

68. The network of claim 66 wherein said transmitted portions are multiplexed into a composite validation value prior to transmission to said network.

69. The network of claim 66 wherein the first validation value is generated from other values in addition to the fixed key value.

70. The network of claim 66 wherein the second validation value is generated from other values in addition to the changeable key value.

* * * * *